United States Patent [19]
Ganser

[11] 3,834,257
[45] Sept. 10, 1974

[54] RADIALLY EXPANDABLE AND CONTRACTIBLE MANDREL

[75] Inventor: Wilhelm Ganser, Stolberg-Busbach, Germany

[73] Assignee: Uniroyal AG, Aachen, Germany

[22] Filed: Apr. 12, 1973

[21] Appl. No.: 350,561

[30] Foreign Application Priority Data
Apr. 17, 1972 Germany............................ 2218561

[52] U.S. Cl.................... 82/44, 242/72 B, 279/1 Q, 279/2 A
[51] Int. Cl........................................... B23b 31/00
[58] Field of Search ................ 29/113 R; 242/72 B; 269/48.1; 279/1 Q, 2; 82/44

[56] References Cited
UNITED STATES PATENTS

| | | | |
|---|---|---|---|
| 1,277,995 | 9/1918 | Muskett | 29/113 R |
| 2,145,806 | 1/1939 | Schnedarek | 242/72 B |
| 3,096,949 | 7/1963 | Huffman | 242/72 B |
| 3,295,188 | 1/1967 | Saueressig | 29/113 R |

*Primary Examiner*—Roy Lake
*Assistant Examiner*—Neil Abrams
*Attorney, Agent, or Firm*—Jay L. Chaskin, Esq.

[57] ABSTRACT

A mandrel or work-piece holder for a tubular blank. The tubular blank may be penetrated by cutting means to provide endless annular elements such as belts for drive or power transmission uses. The mandrel comprises a supporting core having a concentrically arranged radially expandable layer formed by a spirally wound hose. The hose is connected to a source of an inflating medium. Concentric with the hose layer and firmly connected thereto is an intermediate layer of an elastic material. Concentric with the intermediate layer and removable connected thereto is an outer layer of an elastic material. The elasticity of the several layers varies such as to radially decrease.

11 Claims, 1 Drawing Figure

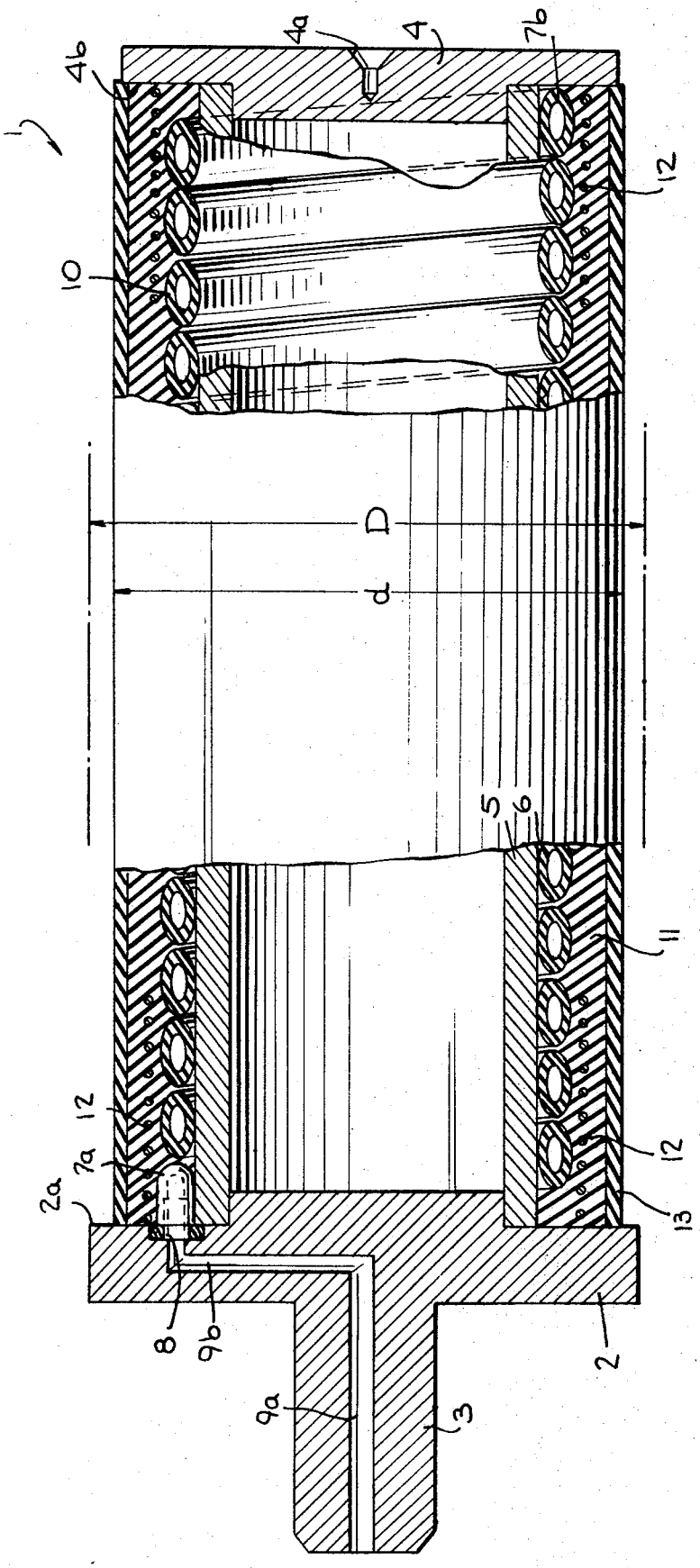

RADIALLY EXPANDABLE AND CONTRACTIBLE MANDREL

This invention relates to work piece holder and more particularly to a radially expansible and contractible mandrel to hold a tubular product.

Throughout various industrial processes there is a need for endless annular elements of elastomeric, thermoplastic, plastic or similar materials. In the production of such annular elements, such as transmission or conveyor belts or belt drives in general, an extruded or molded tubular element, shell or pipe-like blank is formed. These blanks may be comprised of a homogeneous material or may also contain fillers, reinforcements, reinforcing inserts, covering layers and the like. The blanks are fitted onto a work-piece holder or mandrel and a cutting means separates an individual annular element of the desired width. The cutting means, penetrates the tubular blank along a circumferential line and cuts the blank as the blank rotates. The cutting means, in the form of a pointed knife or a stationary circular knife, is on a movable carriage which is advanced in a direction parallel to the longitudinal extent of the tubular blank. The cutting means may be one or more knives, as desired by the structural configuration of the annular element. For example, only one knife is generally needed to make a cut perpendicular to the surface of the tubular blank so as to produce an endless annular element with a straight or vertical side. Further the penetration into the tubular blank may be at a desired angle so as to provide an endless annular element have side at the desired angle. If two knives are arranged at a desired angle but in opposite senses of direction, an endless annular element having a tapered cross-section can be produced. The endless annular element may also have one straight side and one angular side.

Work-piece holders or mandrels to support the tubular blank made of a yielding material are known. Tubular blanks of large diameter are supported on one or more rotating mandrels. However, for tubular blanks of small diameter, correspondingly small diameter mandrels are required. The radial force exerted by the cutting means is of sufficient pressure to distort or bend the mandrel. A hollow mandrel is especially susceptible to the distortion caused by the pressure of the cutting means. The produced endless annular elements are therefore subject to irregularities in dimension. Tapered cuts are especially difficult because the tubular blank also has a tendency to slide axially on the mandrel. When the mandrel is of a hard material the cutting edge of the cutting means is rapidly dulled. Axial movement of the tubular blank will cause double-cuts in a taper cut as well as variations in width in taper and straight cuts.

In order to avoid the above disadvantages a radially expandable and contractible mandrel has been suggested. The mandrel of this type comprises a plurality of radially movable circumferentially arranged segments. In order to provide an uninterrupted peripheral surface, a cylindrical elastomeric casing is circumferentially arranged about the segments. The casing is rigidly attached to one of the segments to prevent rotation. When the segments are radially expanded against the casing the expanded periphery of the casing is flattened in the area of the gaps between adjacent segments. The casing therefore must be selectively reduced to avoid the flat surfaces.

It is an object of the present invention to provide a mandrel which will rigidly support a tubular blank.

It is a further object of the present invention to provide a mandrel which will permit the accurate cutting of endless annular elements from a tubular blank.

It is a further object of the present invention to provide a radially expansible and contractible mandrel for supporting a tubular blank.

It is still another object of the present invention to provide a workpiece holder for the production of an endless annular element having tapered cut sides.

The present invention comprises a radially expansible and contractible mandrel having a unitary construction. The mandrel comprises a rigid tubular core circumferentially surrounded by a plurality of concentric yieldable plastic layers. Immediately adjacent the core is an radially expansible and contractible first layer formed by a spirally wrapped elastic hose. The hose is connected to a source of fluid pressure which will cause the hose to radially expand. Disposed radially outward and immediately adjacent the spirally wrapped hose is a second or intermediate layer of a yieldable elastic member. The second or intermediate layer is firmly connected to the first layer formed by the hose. Concentrically disposed about the intermediate layer is a third layer of a yieldable elastic member. The third layer is not rigidly attached to the immediately radially inwardly adjacent intermediate layer but is detachably connected. The third layer forms the outer peripheral surface of the mandrel upon which is concentrically disposed the tubular blank. The elasticity of the three layers varies such that the elasticity diminishes from the first to the second to the third layer.

Disposed between the firmly connected first and second layers is a relatively non-expandable unyielding reinforcing layer.

The outer third layer forms a wear resistance surface for the penetrating cutting means. The outer third layer is readily removable from the underlying concentric layers for replacement due to wear. In comparison to the protective outer third layer, the second or intermediate layer is relatively thick. When the first layer is radially expanded by fluid pressure, the relatively thick intermediate layer retains a cylindrical shape.

The tubular blank is slipped onto the mandrel when the first layer is not pressurized. Fluid pressure is admitted to the hose causing the plurality of layers to radially expand and firmly support the tubular blank from rotation about the core or axial movement. The cutting means penetrates the tubular blank to the depth of the wear resistant outer third layer. As a consequence of the support of the tubular blank by the mandrel very accurate cuts can be achieved, as well as a uniform width for each endless annular element.

The invention will become more apparent and will be better understood with reference to the following detailed description and the accompanying drawing, in which the single FIGURE is a partial cross-sectional and schematic view of the mandrel.

According to the drawing a mandrel or work-piece holder 1 has two end flanges 2 and 4 which is securely connected, as by welding or screw threads, to the respective ends of a supporting rigid hollow cylindrical center core 5. The end flanges 2 and 4 provide a means for mounting the mandrel 1 in a suitable machine for rotation so as to cut the tubular blanks. Flange 2 includes a projection 3 which can be inserted into a chuck of the cutting machine or into a cavity and secured by circumferentially arranged locking means. Flange 4 includes a shaped recess 4a and is located in the center of the flange.

Radially outward and immediately adjacent to the peripheral surface of the core tube 5 is a radially expandable first layer 6. Layer 6 forms an expandable core and comprises a hose of a highly elastic impermeable material which is helically or spirally wound about the circumferential of cylinder 5 for at least one layer. The coils of the hose are located in juxtaposition and may be in contact. The hose 6 is connected, preferably at one end 7a, to a outlet 8 of a source of an inflating medium. Outlet 8 is located on surface 2a of flange 2 and communicates with passageways to the inflating medium source. The passageways comprise a duct 9b in flange 2 and a duct 9a in the projection 3. Duct 9a is connected via a revolving coupling or joint to the source of the inflating medium. The source of the inflating medium may also be connected to the hose at one or more locations intermediate the length of the mandrel, such connections being via ducts or directly. A plurality of connections ensures a rapid and uniform inflation of the hose. The other end 7b of the hose is sealed by suitable means. The hose therefore provides an annular spiral chamber 10 forming an radially expandable and contractible first layer.

The inflating medium can be any desired source of fluid pressure, pneumatic or hydraulic.

Radially outward of the expandable first layer 6 and immediately adjacent thereof is a second or intermediate layer 11 in the form of a cylindrical tube. Layer 11 is an elastic material which can be a cold molded or cast vulcanized silicon rubber having hardness between shore A20 and A40 and preferably in the range of Shore A25 to A28. Layer 6 and 11 are firmly attached as by vulcanization or a suitable adhesive. The second or intermediate layer 11 may be a single layer or a plurality of layers securely joined together. The elasticity of the second layer 11 is less than the elasticity of the first layer 6. intermediate layer 11 forms an elastic cushion which prevents the uncontrolled expansion of the first layer 6 and provides a uniform smooth outer cylindrical surface as compared to the undulating outer surface of the first layer.

Since the expandable layer 6 is firmly secured to the layer 11, the individual coils of the hose are stationary and cannot move axially.

In order to provide a uniform radial expansion of the hose 6 and the intermediate layer 11 over the entire axial length of the mandrel, a non-expandable or relatively inexpandable insert 12 is located adjacent the respective axial extremities of the mandrel. The insert 12 may be single layer or a plurality of layers embedded within the intermediate layer 11 or may be applied between the first and second layers. The insert 12 may be formed of a cylindrical or tubular woven or non-woven structure or mesh and may be of a textile, plastic or metal material. Insert 12 provides a radial expansion restraint at the respective ends of the mandrel. The overall length of the mandrel is naturally greater than the length of the tubular blank which is arranged concentrically on the mandrel. Upon radial expansion, the portion of the mandrel not covered by the tubular blank would expand beyond the diameter of the blank, causing a distortion at the axial extremeties. Insert 12 restrains the expansion of the mandrel so as to prevent such distortion. Insert 12 does not extend for the axial length of the mandrel but only for a predetermined axial inward distance from each flange. The axial length of insert 12 can be selected depending on the overall length of the mandrel and a consideration of the overall length of any tubular blank to be cut.

Radially outward and immediately adjacent the intermediate layer 11 is a cylindrical outer third layer 13. Layer 13 can be relatively thinner than layer 11. Layer 13 forms a protective casing and wear resistant means for the mandrel. Layer 13 is formed of a highly wear resistant elastomeric material which may also contain fillers, reinforcements, inserts and the like. The elasticity of the layer 13 is less than that of the intermediate layer 11 and may have a hardness of Shore A45 to A50. The fillers, reinforcements, inserts and the like may be fibers, woven or non-woven structures and may be of a textile or a non-textile material, such as plastics, glass. The fillers, reinforcements, inserts and the like may be vulcanized into the elastomer forming the outer third layer 13.

The outer third layer 13 is removably secured to the intermediate layer 11. Layer 13 is positioned axially on the mandrel by the surface 2a of flange 2 and by surface 4b of flange 4. Layer 13 forms a wear surface for the cutting means. Layer 13, however, is easily penetrated by the cutting means and thereby appreciably decreases the need for replacing the cutting means because of dulling. Furthermore, the elasticity of the layer 13 is sufficient to resist the deteriorating effects of the cutting means and the layer 13 has an appreciably increased operating life. In the event the layer 13 requres replacement, it is easily removed from the mandrel when the hose layer is in the relaxed condition. The layer 13 can be replaced by removing flange 4 from the mandrel and sliding a new layer 13 over layer 11. Alternative methods of removing and replacing layer 13 are readily apparent to one skilled in the art. For example, layer 13 can be removed by cutting the layer and a replacement layer can be applied by radially expanding the layer and permitting it to be guided over flange 4 onto layer 11.

Layer 13 is maintained axially by flanges 2 and 4 and rotatably by its natural elasticity and friction.

In operation, the mandrel 1 has a diameter $d$ in the relaxed unexpanded condition. Diameter $d$ is slightly smaller than the smallest diameter of the tubular blank or the like which is to be cut. The tubular blank is guided over the mandrel and fluid pressure is applied to the first layer 6. Annular spiral chamber 10 is inflated causing radial expansion of the hose 6, intermediate second layer 11 and outer third layer 13. The radially expanded mandrel firmly grips the interior surface of the tubular blank and thereby permits the accurate cutting of endless annular elements. The radially expanded mandrel is able to provide a uniform diameter $D$ slightly larger than the internal diameter of the tubular blank. Since the radial expansion of the elastic layers is kept within limits there is no appreciable stretching and fatigue in the layers.

Since the mandrel is able to radially expand to firmly grip a tubular blank, tubular blanks having a range of internal diameters can be cut on the same mandrel. The amount of radial expansion can be varied by the size of the hose, the applied inflation medium and the elasticity of the layers. By way of example, the radially expanded condition may be 0% to 10% greater than the relaxed uninflated condition. The elasticity of each radially expandable layer is such that when the inflating medium is removed, as by venting, the layers relax and the mandrel returns to the diameter $d$.

While there has been described a preferred embodiment of the invention, it will be obvious to those skilled in the art that various changes and modifications may be made without departing from the invention, and it is, therefore intended to include any such changes and modifications as fall within the scope of the appended claims.

What is claimed is:

1. A mandrel for supporting a tubular blank during penetration by cutting means to form endless annular elements comprising a cylindrical supporting core;

a first layer of a radially expandable annular core concentric with and radially outward of the supporting core;

a second layer of an elastic material concentric with and radially outward of the first layer, the first layer being firmly connected to the second layer; the second layer being radially expandable by the first layer to form a uniform non-undulating outer surface;

and a third layer of an elastic material concentric with and radially outward from the second layer, said third layer having non-undulating inner and outer surface, the third layer inner surface in contact with the second layer outer surface, the third layer outer surface in contact with the tubular blank, the third layer being removably secured throughout its contacting length to the second layer;

the elasticity of the second layer being less than that of the first layer, the elasticity of the third layer being less than that of the second layer, the third layer being a wear resistant surface for the cutting means.

2. A mandrel according to claim 1 wherein the first layer comprises at least one annular chamber extending helically along the supporting core.

3. A mandrel according to claim 1 wherein the first layer comprises a hose helically wound about the supporting core.

4. A mandrel according to claim 2 wherein the annular chamber is formed by a hose.

5. A mandrel according to claim 1 wherein the elasticity of the second layer has a degree of hardness between Shore A20 and Shore A40.

6. A mandrel according to claim 1 wherein the elasticity of the third layer has a degree of hardness between Shore A45 and A50.

7. A mandrel according to claim 1 wherein a radially non-expandable insert is located adjacent the respective axial extremities of the mandrel and extends axial inward for a distance less than the axial length of the mandrel.

8. A mandrel according to claim 7 wherein the radially non-expandable insert is located between the first and third layers.

9. A mandrel according to claim 7 wherein the radially non-expandable insert is embedded in the second layer.

10. A mandrel according to claim 7 wherein the radially non-expandable insert comprises a cylindrical layer structure arranged concentrically with the supporting core.

11. A mandrel according to claim 1 wherein the first layer is connecting to a source of an inflating medium.

* * * * *